US007873071B2

(12) United States Patent
Ung et al.

(10) Patent No.: US 7,873,071 B2
(45) Date of Patent: Jan. 18, 2011

(54) MULTIPLE LEVEL SECURITY ADAPTER

(75) Inventors: Kevin Y. Ung, Bellevue, WA (US);
Michael J. Murphy, Newport Coast, CA (US); Brett Hartman, Seattle, WA (US);
Samuel C. Kwok, Bellevue, WA (US);
Thomas E. Donofrio, Federal Way, WA (US); Steven L. Arnold, Kirkland, WA (US); Richard M. Balza, Renton, WA (US)

(73) Assignee: The Boeing Company, Chicago, IL (US)

( * ) Notice: Subject to any disclaimer, the term of this patent is extended or adjusted under 35 U.S.C. 154(b) by 811 days.

(21) Appl. No.: 11/434,313

(22) Filed: May 15, 2006

(65) Prior Publication Data

US 2007/0263658 A1      Nov. 15, 2007

(51) Int. Cl.
*H04J 3/22*      (2006.01)
(52) U.S. Cl. ........................ 370/466; 370/401
(58) Field of Classification Search ......... 370/200–253, 370/272–309, 431–546
See application file for complete search history.

(56) References Cited

U.S. PATENT DOCUMENTS

| | | | | |
|---|---|---|---|---|
| 4,790,003 A * | 12/1988 | Kepley et al. | ............ | 379/88.18 |
| 5,524,253 A | 6/1996 | Pham et al. | | |
| 6,237,097 B1 * | 5/2001 | Frankel et al. | .............. | 713/180 |
| 6,826,684 B1 * | 11/2004 | Fink et al. | ................... | 713/160 |
| 6,898,710 B1 * | 5/2005 | Aull | ........................... | 713/182 |
| 6,901,075 B1 | 5/2005 | Baron | | |
| 2002/0199007 A1 * | 12/2002 | Clayton et al. | .............. | 709/230 |
| 2003/0191799 A1 | 10/2003 | Araujo et al. | | |
| 2004/0120528 A1 * | 6/2004 | Elliott et al. | ................ | 380/278 |
| 2005/0063416 A1 * | 3/2005 | Shin et al. | .................... | 370/465 |
| 2005/0086537 A1 * | 4/2005 | Johnson | ....................... | 713/201 |
| 2005/0220139 A1 * | 10/2005 | Aholainen | .................. | 370/466 |
| 2006/0026290 A1 * | 2/2006 | Pulito et al. | ................. | 709/227 |
| 2006/0098649 A1 * | 5/2006 | Shay | .......................... | 370/389 |
| 2009/0296599 A1 * | 12/2009 | Ayyagari et al. | ............ | 370/253 |

FOREIGN PATENT DOCUMENTS

| WO | WO-02/078268 A | 10/2002 |
|---|---|---|
| WO | WO-2004/047402 A | 6/2004 |

* cited by examiner

*Primary Examiner*—Ricky Ngo
*Assistant Examiner*—Iqbal Zaidi
(74) *Attorney, Agent, or Firm*—Toler Law Group (57) ABSTRACT

In exemplary embodiments, data with a format compatible with a first protocol standard is received on behalf of a first application. When the format of the data is not compatible with a second protocol standard, the format of the data is automatically transformed to a format that is compatible with the second protocol standard. The data is transmitted to a second application service using the second protocol standard. The data may be received from the second application. When the format of the data is not compatible with a third protocol standard, the format of the data is automatically transformed to a format that is compatible with the third protocol standard. The data is transmitted on behalf of a third application using the third protocol standard. The first and third applications may be in first and second protected enclaves. The second application may include a security gateway service.

29 Claims, 4 Drawing Sheets

MULTIPLE LEVEL SECURITY ADAPTER

BACKGROUND

Several technological approaches and managerial procedures have been developed to help ensure availability, integrity, and confidentiality of information exchanged and managed by a computer system or network. One such technological approach is to provide and manage protected enclaves (or security enclaves).

In a protected enclave, a community-of-interest is established in which users having a need-to-know run applications within a network that is protected by predetermined security measures. The users may be co-located but need not be co-located. The applications may include, without limitation, electronic mail (Email), instant messaging (IM), file transfer, and the like. The security measures may be directed to protect content that includes national security information (such as confidential, secret, top secret, and the like); financial information; business information; personal information; and the like.

When a protected enclave is established, measures must be taken to enable appropriate sharing or exchange of data between the protected enclave and the outside world. In one approach to sharing data, a secure network server (or a guard server) acts as a gateway to route and filter data exchanged between the protected enclave and the outside world, or between a first protected enclave operating at a first security level and a second protected enclave operating at a second security level that is different (either higher or lower) than the first security level.

Thus, the guard server may filter sensitive information from the data originated by an application in the protected enclave. However, in order for the guard server to filter the data, the guard server must understand how to parse the data. Therefore, both the guard server and the application must be cognizant of format of the data originated by the application.

If the guard server understands how to parse the data, then the guard server can filter the data and pass on the data, if appropriate. As an example, a file transfer application in a protected enclave may transfer files using an FTP protocol in its application layer. The guard server application may also include the FTP protocol in its application layer. In such a case, the guard server understands how to parse the data that the application wants to send out of the protected enclave. Therefore, the guard server filters the information and can route the data accordingly.

On the other hand, if the guard server does not understand how to parse the data, then the guard server will send the data to a suitable "data dump" and may generate an event for a security event log. As an example, an application in a protected enclave may send a web page using an HTTP protocol in its application layer. However, the guard server application may not include the HTTP protocol in its application layer. In such a case, the guard server does not understand how to parse the data that the application wants to send out of the protected enclave. Therefore, the guard server cannot filter the information and cannot route the data accordingly. Instead, the guard server will send the data to a suitable "data dump" and may generate an event for a security event log.

In currently known approaches, the filtering described above is performed by the guard server. In order for the guard server to recognize a data format that was previously unrecognizable, the guard server would have to be reprogrammed to recognize the desired data format. Alternately, all of the machines running applications in the protected application would have to be reprogrammed to recognize all data formats that are recognized by the guard server. Either approach is extremely time-and-labor intensive and, therefore, is cost prohibitive.

As a result, the design of currently known guard servers is tightly coupled to the applications executed in the protected enclaves. This tight coupling can reduce flexibility of design of the guard server and of the applications; can reduce re-use of software; can increase "lock-in" and dependence on certain vendors; and can increase integration cost.

Therefore, it would be desirable for a guard server to be able to recognize data formats of applications executed in the protected enclaves without reprogramming the guard server to recognize a previously unrecognizable data format and without reprogramming all machines running applications in a protected enclave to recognize all data formats that are recognized by the guard server.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

Exemplary embodiments provide computer executable methods, computer program products, and systems for exchanging data. In exemplary embodiments, data is received on behalf of a first application using a first protocol standard. The data has a format compatible with the first protocol standard. A determination is made whether the format of the data is compatible with a second protocol standard. When the format of the data is not compatible with the second protocol standard, the format of the data is automatically transformed to a format that is compatible with the second protocol standard. The data is transmitted to a second application service using the second protocol standard.

According to an aspect, the data may be received from the second application using the second protocol standard. The data has a format compatible with the second protocol standard. A determination is made whether the format of the data is compatible with a third protocol standard. When the format of the data is not compatible with the third protocol standard, the format of the data is automatically transformed to a format that is compatible with the third protocol standard. The data is transmitted on behalf of a third application using the third protocol standard.

According to other aspects, the first application may be provided within a first protected enclave, the second application may include a security gateway service, and the third application may provided within a second protected enclave.

According to further aspects, the first protocol standard may define a first security level and the third protocol standard may define a second security level.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
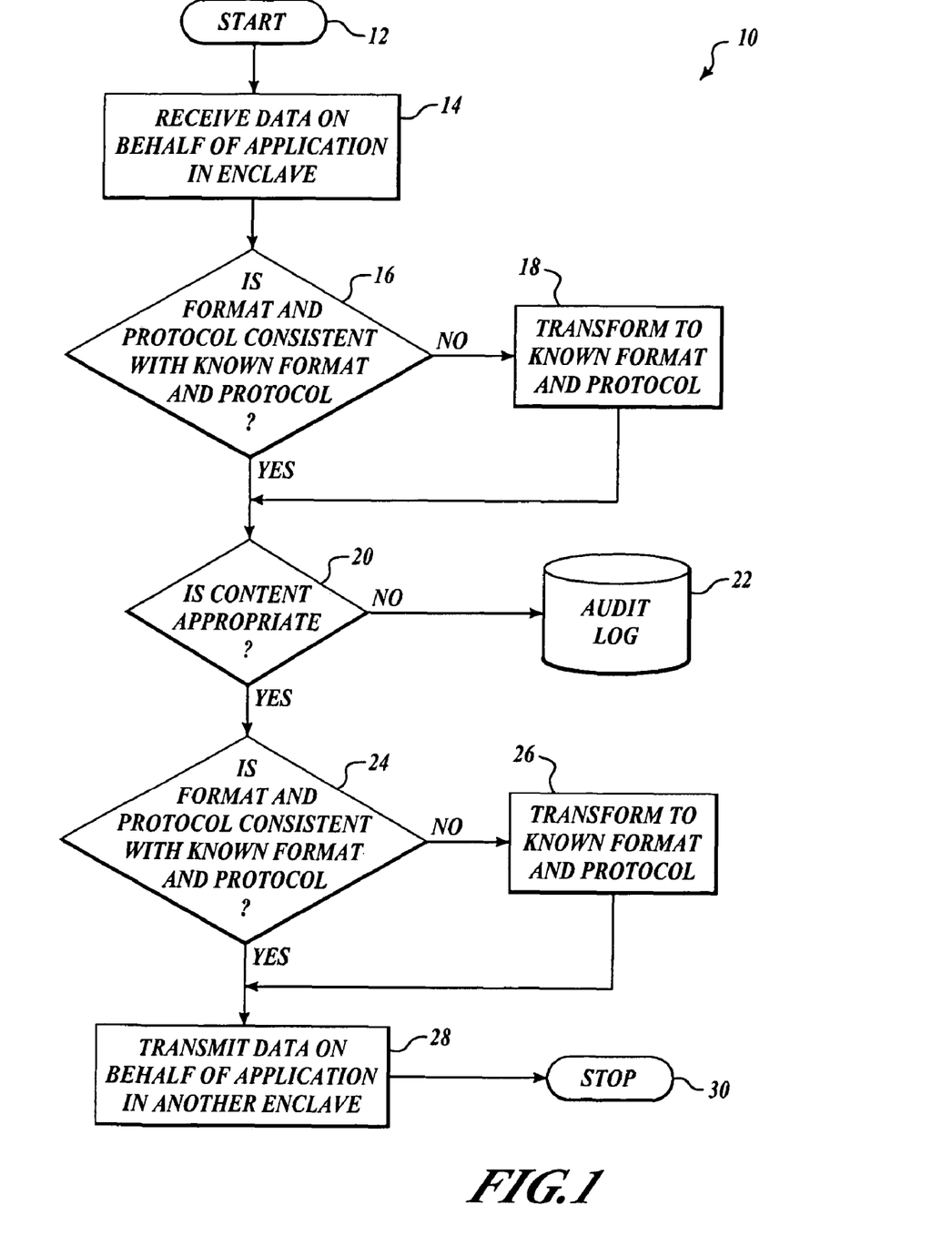
FIG. 1 is a flow chart of an exemplary method of exchanging data.

By way of overview and referring to FIG. 1, at a block 14 data is received on behalf of a first application in a first protected enclave using a first protocol standard. The data has a format compatible with the first protocol standard, and the first protocol standard may define a first security level. At a decision block 16, a determination is made whether the format of the data is compatible with a second protocol standard. When the format of the data is not compatible with the second protocol standard, at a block 18 the format of the data is automatically transformed to a format that is compatible with the second protocol standard. The data is transmitted to a second application service, such as a security gateway service, using the second protocol standard. The data may be received from the second application in a second protected enclave using the second protocol standard. The data has a format compatible with the second protocol standard. At a decision block 24, a determination is made whether the format of the data is compatible with a third protocol standard. The third protocol standard may define a second security level. When the format of the data is not compatible with the third protocol standard, at a block 26 the format of the data is automatically transformed to a format that is compatible with the third protocol standard. At a block 28 the data is transmitted on behalf of a third application using the third protocol standard. Details of exemplary embodiments will now be set forth below.

Exemplary Method

Still referring to FIG. 1, an exemplary method 10 starts at a block 12. At the block 14, data is received on behalf of a first application in a first protected enclave using a first protocol standard. The protected enclave is a community-of-interest in which users having a need-to-know run applications within a network that is protected by predetermined security measures. The users may be co-located but need not be co-located. The applications may include, without limitation, electronic mail (Email), instant messaging (IM), file transfer, and the like. The information exchanged within the protected enclave may include without limitation national security information, business information, financial information, personal information, health care information, and the like.

The data received on behalf of the application at the block 16 has a format compatible with the first protocol standard. The data can be transferred in one of two modes: ASCII mode; and binary mode. In ASCII mode, individual letters, numbers, and characters are transferred using their ASCII character codes. When received, the data is saved in a text file in an appropriate format. In binary mode, the data is sent bit for bit. When received, the data is stored by the receiving machine in its own format.

The protocol standard, sometimes referred to as a protocol stack, defines the data format and is the set of protocols for layers of interconnection, such as those set forth in the Open Systems Interconnection (OSI) model. As used herein, the term protocol standard refers to the protocols implemented in software in the layers including and above the transport layer—that is, the transport layer and the application layer. While a protocol stack may also be considered to include the session layer and the presentation layer, in practice the transport layer, the session layer, the presentation layer and the application layer typically are combined into the transport layer and the application layer. As such and as used herein, the term protocol standard refers to the transport layer and the application layer as used in practice—that is, that combines the transport layer, the session layer, the presentation layer and the application layer. By way of further explanation, such usage also means that the term protocol standard does not refer to the physical layer, the data link layer, or the network layer (or the layer sometimes referred to as "layer 2.5").

Examples of the protocol standards are set forth in Table 1 for exemplary applications on behalf of which data can be received (or transmitted, such as at the block 28).

TABLE 1

| Application | Transport Layer | Application Layer |
| --- | --- | --- |
| Email | TCP | SMTP |
| Instant messaging | TCP | XMPP |
| File transfer | TCP | FTP |
| Web browser | TCP | HTTP |
| Pub/sub | TCP | JMS, SOAP, or RDDS |

The first protocol standard may define a first security level. For example, the transport and application layers may support encryption of the data. As another example, security labeling may be put in messages at the application layer.

At a decision block 16, a determination is made whether the format of the data is compatible with a second protocol standard. The second protocol standard is a protocol stack for a second application. In an exemplary embodiment, the second application is a guard service, such as that for a secure network server between a protected enclave and the outside world or between two protected enclaves. An exemplary protocol standard for a guard service generally includes TCP for use at the transport layer. Also, some guard protocol standards may require security labeling at the application layer and/or the transport layer. Given by way of non-limiting example, the determination of compatibility at the decision block 16 may be made by determining whether the first application is a type of application that uses a data format that is predetermined to be expected by the guard service.

When the format of the data received on behalf of the application at the block 14 is not compatible with the second protocol standard, at a block 18 the format of the data is automatically transformed to a format that is compatible with the second protocol standard. In an exemplary embodiment, a transformation routine may be selected from a library of transformation routines and performed as desired for a particular application. For example, the library of transformation routines may include a generic transformation function, such as an XSLT transformation engine or the like. The library of transformation routines may also include routines that have been customized for desired applications.

The following non-limiting examples illustrate scenarios in which the format of the data received on behalf of the application at the block 14 is not compatible with the second protocol standard. Given by way of non-limiting example, the first application in the protected enclave may be a web browser that is sending a web page. From Table 1, the protocol standard for the web page uses TCP at the transport layer and HTTP at the application layer. The data is transferred in ASCII mode. In this scenario, the second application is a guard service that can filter messages (because its application layer uses an SMTP protocol). But, in this scenario, the guard service does not include an HTTP protocol in its application layer. Thus, the guard service of the second application can understand how to parse information in an Email message but cannot understand how to parse information in a web page. In this scenario, at the block 18, the data format of the web page (in which the application layer uses an HTTP protocol) is transformed to a known format and known protocol that is compatible with the guard service's protocol standard (in which the application layer uses an SMTP protocol). As another example in which the format of the data received on behalf of the application at the block 14 is not compatible with the second protocol standard, a determination may be made at the block 16 that an application layer protocol is intermixed with the data received on behalf of the application. In such a case, at the block 18 the intermixed application layer protocol is automatically removed from the data.

After the format of the data has been transformed at the block 18 or, alternately, when the format of the data received on behalf of the application at the block 14 is compatible with the second protocol standard, at a decision block 20 a determination may be made whether information content of the data is appropriate for sharing outside the protected enclave. The filtering and determination may be effected by keyword matching and comparison against predetermined keywords, or by other text classification or data mining routines, if desired. Advantageously, such filtering of the data is possible because either the format of the data received on behalf of the application at the block 14 is compatible with the second protocol standard or was transformed at the block 18 to a known format and known protocol that is compatible with the second protocol standard. In either case, the data that was received on behalf of the application at the block 14 advantageously is now compatible with the second protocol standard. When the second application is a guard service, this compatibility represents an advantage over currently known guard services that cannot understand how to parse the data and instead send the data to a suitable "data dump" and merely generate an event for an event log.

When content is determined to be inappropriate, an event is generated and sent to an audit log 22 for later analysis, as desired. Given by way of non-limiting example, content may be determined to be inappropriate when the data contains text that includes predetermined content that is not cleared for access outside the protected enclave.

When content has been determined to be appropriate for sharing outside the protected enclave, the data is shared outside the protected enclave. In another protected enclave at a decision block 24, determination is made whether the format of the data is compatible with a third protocol standard. The third protocol standard is a protocol stack for a third application. Details of the protocol standard and data format for the third application are the same as those for the first application discussed above and, as a result, need not be repeated. The third application in the second protected enclave may be, but need not be, the same application as the first application in the first protected enclave. Alternately, the third application in the second protected enclave may be a different application from the first application in the first protected enclave. The determination at the block 24 suitably is made in the same manner as the determination at the block 16.

When a determination is made at the decision block 24 that the format of the data is not compatible with the third protocol standard, at a block 26 the format of the data is automatically transformed to a format that is compatible with the third protocol standard. The transformation at the block 26 suitably is made in the same manner as the transformation at the block 18.

After the format of the data has been transformed at the block 26 or, alternately, when the format of the data is compatible with the third protocol standard, at a block 28 the data is transmitted on behalf of the third application. The method 10 ends at a block 30.

Exemplary Software

Figure 2:
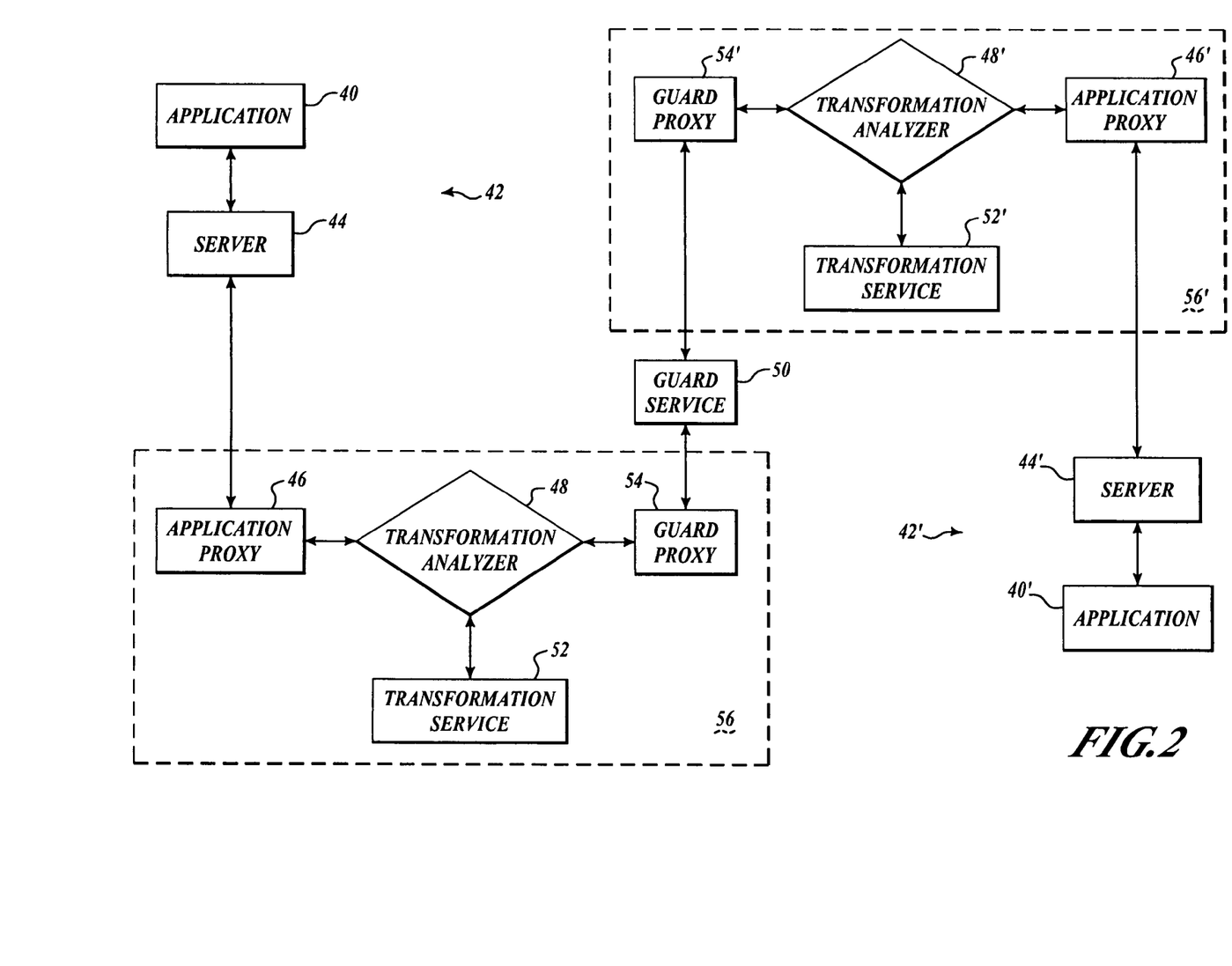
FIG. 2 is a software block diagram of exemplary software processing blocks that implement the method of FIG. 1.

Referring now to FIG. 2, exemplary software implements processes of the method 10 (FIG. 1). Advantageously, the exemplary software enables data format to be transformed as desired without a need to reprogram the guard server to recognize a previously unrecognizable data format or to reprogram all machines running applications in a protected enclave to recognize all data formats that are recognized by the guard server. The exemplary software implementation will be discussed in the same order as the discussion of the method 10 (FIG. 1).

Data from an application 40 in a protected enclave 42 is received from a server 44 on behalf of the application 40 by an application proxy 46. The application proxy 46 enables communication with the application 40 using the particular protocol standard of the application 40. The protocol standard has already been described above in the context of the method 10 (FIG. 1).

A transformation analyzer 48 analyzes the data received by the application proxy 46 on behalf of the application 40 and makes a determination whether the format of the data is compatible with a protocol standard for a guard service 50. In an exemplary embodiment, logic is provided by an operator. The logic decides which particular application data is to be transformed. For example, the logic may identify the type of the application 40. The logic may also identify the type of data that came from the application 40. Given by way of non-limiting example, the type of data may be identified as binary data or ASCII data, such as without limitation HTML or XML. The transformation analyzer 48 may compare the type of the application 40 against a list of predetermined application types that send data to the guard service that the guard service 50 is expecting. The transformation analyzer 48 may also compare the type of the data that came from the application 40 against a list of predetermined data types that the guard service 50 is expecting. Given by way of a non-limiting, illustrative example, the guard service 50 may be expecting ASCII SMTP data from an Email application. In this case, a list of predetermined applications includes Email applications but not web browsers, and a list of predetermined data types includes ASCII SMTP data but not ASCII HTML data. However, the application 40 may be a web browser that sends ASCII HTML data. The transformation analyzer 48 identifies the application 40 as a web browser and may identify the data type as ASCII HTML. The transformation analyzer compares the identified web browser application and/or the identified ASCII HTML data against the predetermined list that does not include web browsers or ASCII HTML data. The transformation analyzer thereby determines that, in this non-limiting example, the data is not compatible with the guard service 50 and is to be transformed. The analysis performed by the transformation analyzer 48 implements the process of the decision block 16 (FIG. 1).

When the format of the data received by the application proxy 46 on behalf of the application 42 is not compatible with the protocol standard of the guard service 50, a transformation service 52 automatically transforms the format of the data to a format that is compatible with the protocol standard of the guard service 50. The transformation performed by the transformation service 50 implements the process of the block 18 (FIG. 1). Given by way of non-limiting example, the transformation service 52 may be implemented as an XSLT transformation engine or the like.

After the format of the data has been transformed by the transformation service 52 or, alternately, when the format of the data received on behalf of the application 40 by the application proxy 46 is compatible with the protocol standard of the guard service 50, a guard proxy 54 enables communication with the guard service 50 using the protocol standard of the guard service 50 (such as by using TCP at the transport layer).

Advantageously, the application proxy 46, the transformation analyzer 48, the transformation engine 52, and the guard proxy 54 may be provided as a software suite 56. Advantageously, the software suite 56 resides in the protected enclave 42—but not in a guard server (not shown) that provides the guard service. Providing the software suite 56 outside the guard server advantageously enables data format to be transformed as desired without a need to reprogram the guard server to recognize a previously unrecognizable data format or to reprogram all machines running applications in the protected enclave 42 to recognize all data formats that are recognized by the guard server.

Figure 3:
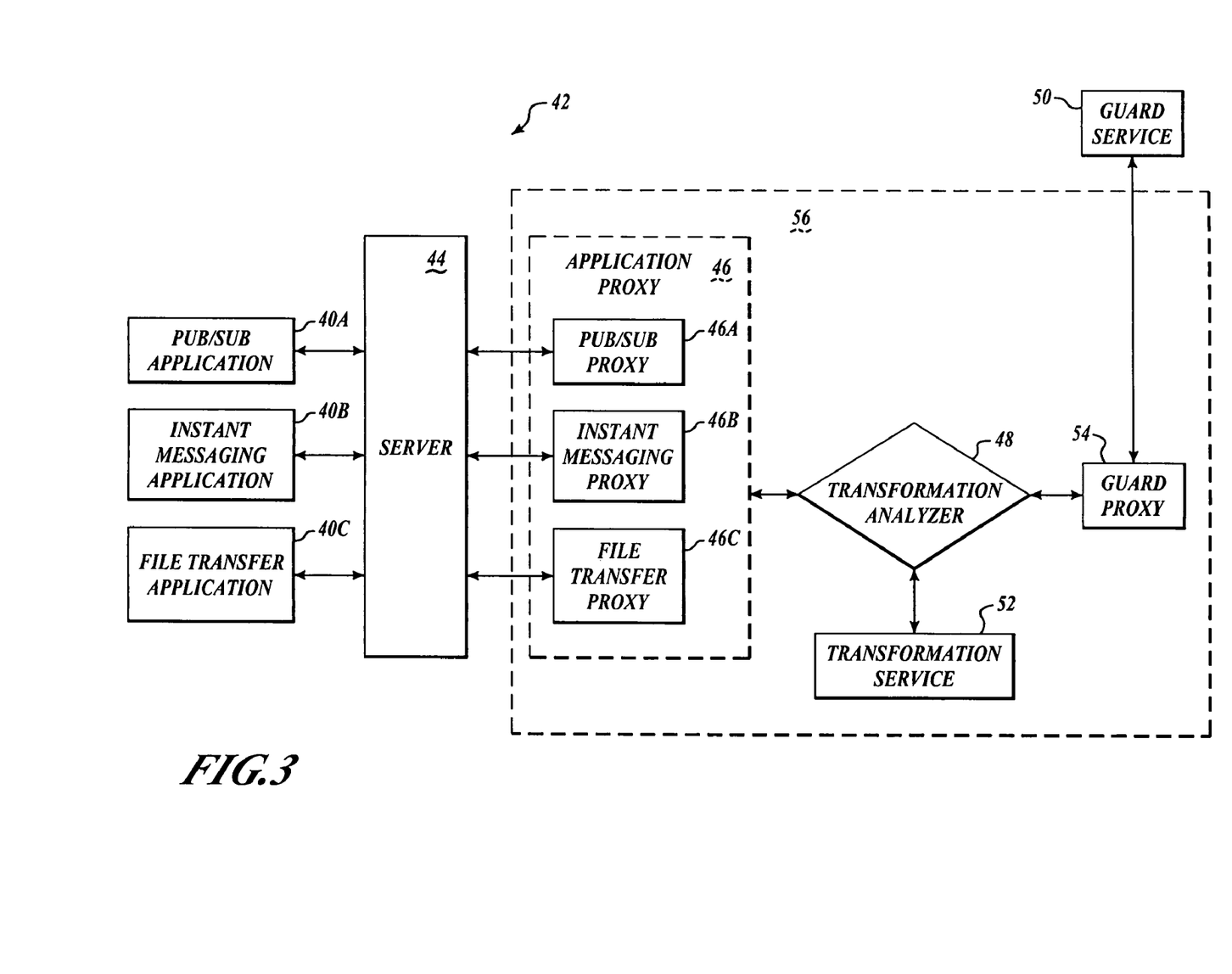
FIG. 3 is a software block diagram showing non-limiting details of the processing blocks of FIG. 2.

Referring additionally to FIG. 3, additional details will be set forth regarding the software suite 56. The application proxy 46 may include several application proxies—one for each application resident in the protected enclave 42. Given by way of non-limiting example, the application proxy may include a pub/sub proxy 46A, an instant messaging proxy 46B, and a file transfer proxy 46C. The pub/sub proxy 46A enables communication with a pub/sub application 40A. The instant messaging proxy 46B enables communication with an instant messaging application 40B. The file transfer proxy 46C enables communication with a file transfer application 40C. As an additional application(s) 40 is added to the protected enclave 42, the application proxy 46 is simply reprogrammed to add a corresponding application proxy(ies) to enable communication with the added application(s). Further, if for some reason a change is made to the protocol standard of any of the applications 40 in the protected enclave, the application proxy 46 simply is reprogrammed. Thus, there is no need to reprogram all machines running applications in the protected enclave 42 to recognize all data formats that are recognized by the guard server.

Further, if the guard server is replaced or if a change is made to the protocol standard of the guard service, then the guard proxy 54 simply is reprogrammed. Advantageously, in such a case there is no need to reprogram the guard server.

Referring back to FIG. 2, the data is transmitted to the guard service 50 for ultimate reception by an application 40' in a protected enclave 42'. The guard service 50 receives the data and filters the data to make a determination whether information content of the data is appropriate for sharing outside the protected enclave 42. Thus, the guard service implements processing of the decision block 20 (FIG. 1).

In the protected enclave 42', a software suite 56' includes a guard proxy 54', a transformation analyzer 48', a transformation service 52', and an application proxy 46'. The guard proxy 54' receives the data from the guard service 50. The guard proxy 54', the transformation analyzer 48', the transformation service 52', and the application proxy 46' perform the functions described above for the guard proxy 54, the transformation analyzer 48, the transformation service 52, and the application proxy 46 in a mirror-image fashion. Thus, the data that is received by the guard proxy 54' is processed and is ultimately transmitted on behalf of the application 40' via a server 44'.

Exemplary Network Environment

Figure 4:
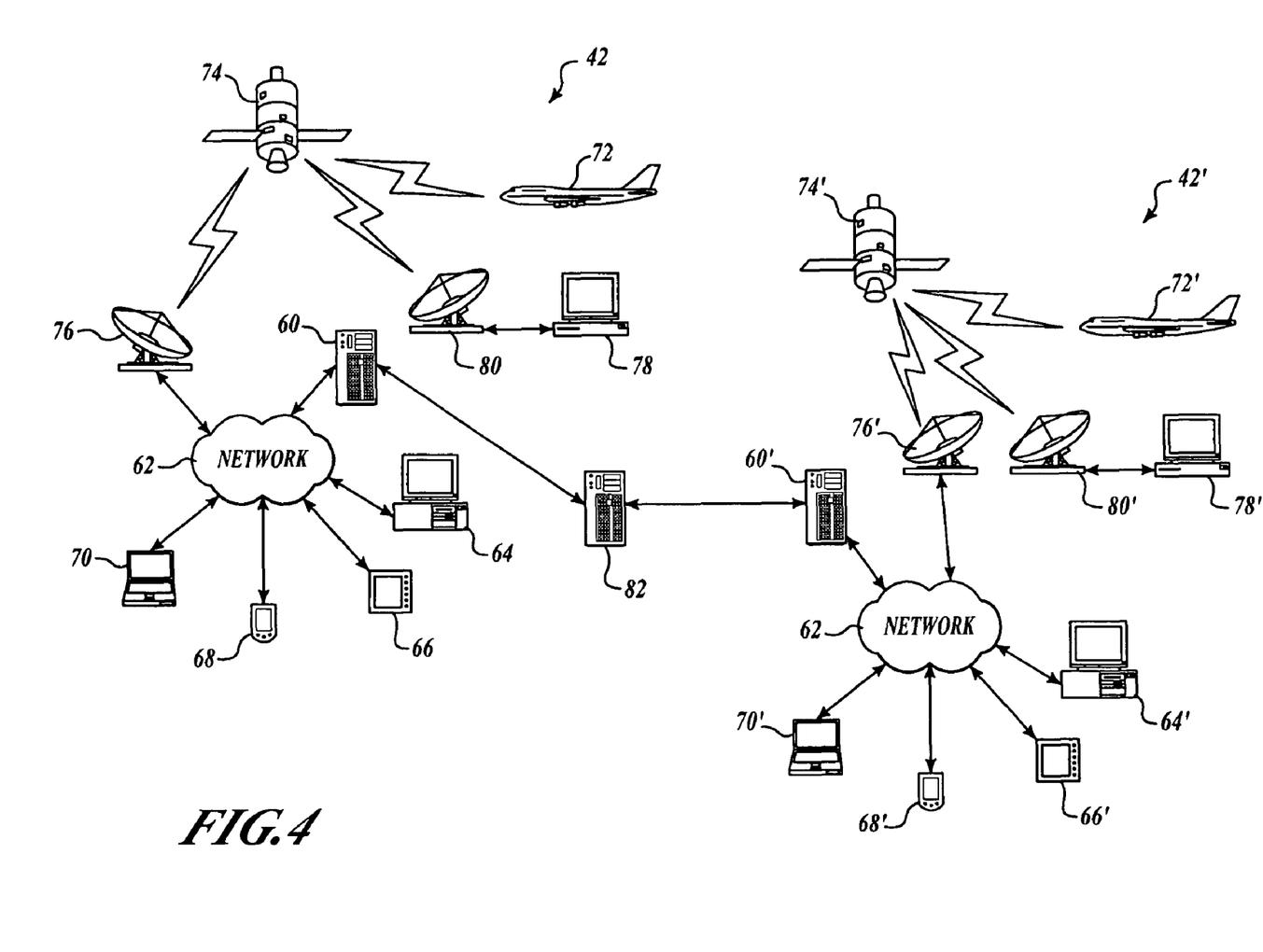
FIG. 4 is a block diagram of an exemplary host environment that implements the method of FIG. 1.

Referring now to FIG. 4, the software suites 56 and 56' (FIG. 2) reside in storage (not shown) and are executed by processors (not shown) in computers 60 and 60', such as routers, in the protected enclaves 42 and 42'. The software suites 56 and 56' can each be executed by processors provided in one respective computer 60 and 60' or, if desired, execution of the software suites 56 and 56' can be distributed among more computers. Computers are extremely well known in the art and, therefore, a discussion of their construction and operation is not necessary.

The protected enclave 42 can include users running applications on a variety of computing machines. The protected enclave 42 may represent a community of interest of users with a need to know at a certain level of security. The users may be co-located but need not be co-located. The computing machines of the protected enclave 42 may communicate with each other and the computer 60 directly (not shown) or via a network 60, such as without limitation the Internet. The protected enclave 42 can include any computing machine as desired, such as without limitation a computer 64, a pen computer 66, a hand-held computer 68, a laptop computer 70, and the like. The protected enclave 42 can also include computing machines within a mobile platform 72, such as without limitation an airplane, whose connectivity is provided via a satellite 74 and a ground station 76 (such as the mobile connectivity provided by Connexion by Boeing). Also, the satellite 74 may provide connectivity to a computer 78 via a ground station 80.

The protected enclave 42' may include similar components as the protected enclave 42. Each component of the protected enclave 42' that is similar to a component of the protected enclave 42 is denoted with a same reference number that is appended with a prime ('). The protected enclave 42' may represent a community of interest of users with a need to know at a level of security that is different (that is, either higher or lower) than the security level of the protected enclave 42.

A guard server 82 provides the guard service 50 (FIG. 2) and is directly connected to the computers 60 and 60'. Advantageously, as discussed above, the software suites 56 and 56' do not reside on the guard server 82. Instead, as discussed above, the software suites 56 and 56' reside on the computers 60 and 60', respectively, or are distributed among more computers (that are not the guard server 82) in their respective protected enclaves. Therefore, execution of the software suites 56 and 56' on computers within the protected enclaves 42 and 42' (instead of on the guard server 82) enables data format to be transformed as desired without a need to reprogram the guard server 82 to recognize a previously unrecognizable data format or to reprogram all machines running applications in the protected enclaves 42 and 42' to recognize all data formats that are recognized by the guard server 82.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A computer executable method of exchanging data, the method comprising:
receiving data to be transmitted from a first protected enclave on behalf of a first application of the first protected enclave using a first protocol standard, the data having information content in a first format that is compatible with the first protocol standard, wherein the first protected enclave is associated with a first security level that limits information that can be sent from the first protect enclave;
determining whether a security gateway service that enforces the first security level is operable to determine whether the information content of the data is authorized to be accessed outside the first protected enclave based on the first security level, wherein when the first format of the data is compatible with a second protocol standard that is associated with the security gateway service, the security gateway service is operable to determine whether the information content is authorized to be accessed outside the first protected enclave;
when the first format of the data is not compatible with the second protocol standard, automatically transforming the data to a second format that enables the security gateway service to parse the information content; and
transmitting the data using the second format, to the security gateway service to determine whether the information content is authorized to be accessed outside the first protected enclave based on the first security level.

2. The method of claim 1, further comprising:
receiving the data from the security gateway service after the security gateway service parses the information content and filters the information content based on the first security level, the data having the second format;
determining whether the second format is compatible with a third protocol standard, wherein the third protocol standard is associated with a second protected enclave;
when the second format is not compatible with the third protocol standard, automatically transforming the data from the second format to a third format that is compatible with the third protocol standard; and
transmitting the data to a second application associated with the second protected enclave using the third format.

3. The method of claim 2, wherein:
the security gateway service filters the information content sent from the first protected enclave by parsing the information content of the data to determine whether user-generated text in the information content is authorized to be transmitted to the second protected enclave from the first protected enclave based on the first security level.

4. The method of claim 1, further comprising:
determining whether an application layer protocol is intermixed with the data received on behalf of the first application; and
when the application layer protocol is intermixed with the data received on behalf of the first application, automatically removing the intermixed application layer protocol from the data.

5. The method of claim 2, wherein the first protocol standard, the second protocol standard, and the third protocol standard each include a respective transport layer protocol and a respective application layer protocol.

6. The method of claim 1, wherein determining whether the security gateway service is operable to determine whether the information content of the data is authorized to be accessed outside the first protected enclave includes:
identifying a type of the first application; and
comparing the type of the first application to a list of predetermined application types that are compatible with the security gateway service.

7. The method of claim 6, wherein determining whether the security gateway service is operable to determine whether the information content of the data is authorized to be accessed outside the first protected enclave includes:
identifying a type of the data received on behalf of the first application; and
comparing the type of the data received on behalf of the first application to a list of predetermined data types that are compatible with the security gateway service.

8. The method of claim 1, wherein automatically transforming the first format of the data to the second format that is compatible with the second protocol standard is performed by an Extensible Stylesheet Language Transformations (XSLT) transformation engine.

9. A non-transitory computer readable storage medium, comprising:
computer readable program code executable by a processor to receive data to be sent from a first protected enclave on behalf of a first application using a first protocol standard, the data having information content in a first format that is compatible with the first protocol standard, wherein the first protected enclave is associated with a first security level that limits information that can be sent from the first protected enclave;
computer readable program code executable by the processor to determine whether a security gateway that enforces the first security level is operable to determine whether the information content is authorized to be accessed outside the first protected enclave, wherein when the first format is compatible with a second protocol standard the security gateway is operable to determine whether the information content is authorized to be accessed outside the first protected enclave;
computer readable program code executable by the processor to transform the data to a second format that is compatible with the second protocol standard when the first format is not compatible with the second protocol standard; and
computer readable program code executable by the processor to transmit the data using the second format to the security gateway to determine whether the information content is authorized to be accessed outside the first protected enclave based on the first security level.

10. The non-transitory computer readable storage medium of claim 9, further comprising:
computer readable program code executable by the processor to receive the data from the security gateway after the security gateway determines that the information content is authorized to be accessed outside the first protected enclave based on the first security level, the data having the second format;
computer readable program code executable by the processor to determine whether the second format is compatible with a third protocol standard, wherein the third protocol standard is related to a second protected enclave;
computer readable program code executable by the processor to transform the data to a third format that is compatible with the third protocol standard when the second format is not compatible with the third protocol standard; and computer readable program code executable by the processor to transmit the data to a second application associated with the second protected enclave using the third format.

11. The non-transitory computer readable storage medium of claim 9, further comprising:
computer readable program code executable by the processor to determine whether an application layer protocol is intermixed with the data received on behalf of the first application; and
computer readable program code executable by the processor to remove the intermixed application layer protocol from the data when the application layer protocol is intermixed with the data.

12. A system comprising:
a first computer processing component configured to receive data to be sent out of a first protected enclave from a first application, the data having a first format compatible with a first protocol standard, wherein the first protected enclave is associated with a first security level that limits information that can be sent from the first protected enclave;
a second computer processing component configured to determine whether the first format is compatible with a second protocol standard, wherein the second protocol standard is associated with a security gateway that determines whether the information content is authorized to be transmitted outside the first protected enclave based on the first security level, wherein the security gateway is operable to determine whether the information content is authorized to be accessed outside the first protected enclave when the first format of the data is compatible with a second protocol standard that is associated with the security gateway;
a third computer processing component configured to automatically transform the data to a second format that is compatible with the second protocol standard when the first format is not compatible with the second protocol standard; and
a fourth computer processing component configured to transmit the data using the second format to the security gateway to determine whether the information content of the data is authorized to be transmitted outside the first protected enclave based on the first security level.

13. The system of claim 12, further comprising:
a fifth computer processing component configured to receive the data from the security gateway after the security gateway determines that the information content is authorized to be transmitted outside the first protected enclave, the data having the second format;
a sixth computer processing component configured to determine whether the second format is compatible with a third protocol standard, wherein the third protocol standard defines a second security level associated with a second protected enclave;
a seventh computer processing component configured to automatically transform the data to a third format that is compatible with the third protocol standard when the second format is not compatible with the third protocol standard; and
an eighth computer processing component configured to transmit the data to a second application associated with the second protected enclave using the third format.

14. The system of claim 13, wherein the first, second, third, and fourth computer processing components are provided within the first protected enclave and the security gateway is outside the first protected enclave.

15. The system of claim 14, wherein the security gateway implements a security gateway service that parses the data to determine the information content of the data, and filters the data based on the information content of the data and based on the first security level.

16. The system of claim 15, wherein the fifth, sixth, seventh, and eighth computer processing components are provided within the first protected enclave.

17. The system of claim 12, further comprising:
a ninth computer processing component configured to determine whether an application layer protocol is intermixed with the data received from the first application; and
a tenth computer processing component configured to, when the application layer protocol is intermixed with the data received from the first application, automatically remove the intermixed application layer protocol from the data.

18. The system of claim 12, wherein the second computer processing component includes:
an eleventh computer processing component configured to identify a type of the first application; and
a twelfth computer processing component configured to compare the type of the first application to a list of predetermined application types that are compatible with the security gateway to determine whether the first format is compatible with the second protocol standard.

19. The system of claim 18, wherein the second computer processing component further includes:
a thirteenth computer processing component configured to identify a type of the data received from the first application; and
a fourteenth computer processing component configured to compare the type of the data to a list of predetermined data types that are compatible with the security gateway to determine whether the first format is compatible with the second protocol standard.

20. The method of claim 2, wherein the second protected enclave is associated with a second security level that is different than the first security level.

21. The method of claim 1, wherein the security gateway service determines whether the information content is authorized to be accessed outside the first protected enclave by keyword searching the information content of the data.

22. The method of claim 1, wherein the security gateway service determines whether the information content is authorized to be accessed outside the first protected enclave by applying text classification to the information content of the data.

23. The method of claim 1, wherein the security gateway service determines whether the information content is authorized to be accessed outside the first protected enclave by applying data mining to the information content of the data.

24. The method of claim 1, wherein determining whether the first format is compatible with the second protocol standard comprises determining whether the first format is a format recognized by the security gateway service.

25. The method of claim 1, wherein the data is transformed using a generic transformation routine.

26. The method of claim 1, further comprising:
adding a new application within the first protected enclave, wherein the new application sends second data having a new format that is not compatible with the second protocol standard; and
adding a new application proxy to the first protected enclave, wherein the new application proxy receives the second data from the new application and automatically transforms the second data to the second format for transmission to the security gateway service.

27. The method of claim 1, further comprising:

installing a new security gateway service, wherein the new security gateway service is associated with a fourth protocol standard; and adding new transformation information to a transformation service within the first protected enclave, wherein the new transformation information is usable to transform data received in the fourth protocol standard to the first format.

28. The system of claim 12, wherein the first computer processing component, the second computer processing component, the third computer processing component, and the fourth computer processing component reside in a router separate from the security gateway.

29. The method of claim 1, wherein the first security level is associated with confidentiality of the information content, wherein the confidentiality of the information content relates to whether the information content is one of national security information, financial information, business information and personal information.

* * * * *